Patented Aug. 24, 1943

2,327,890

UNITED STATES PATENT OFFICE 2,327,890

SUBSTITUTED PHENOXYALKYL ETHERS

Henry R. Henze, Austin, Tex., assignor to Parke, Davis & Company, Detroit, Mich., a corporation of Michigan No Drawing. Application April 17, 1940, Serial No. 330,064

5 Claims. (Cl. 260—309)

The invention relates to a new class of methyl phenyl ethers wherein a hydrogen atom of the methyl group of said ethers is replaced by a 5-hydrocarbon-substituted hydantoin radical. More especially, the invention refers to the new class of compounds of the following general formula,

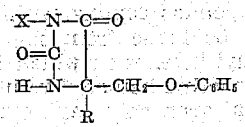

where R is a hydrocarbon radical such as saturated or unsaturated alkyl, substituted alkyl, phenyl, substituted phenyl, X representing a member of the group hydrogen, an alkali metal, an alkaline earth metal and magnesium. The new compounds may therefore also be designated as 5-hydrocarbon substituted-5-phenoxymethyl hydantoins.

The new compounds of the invention may readily be obtained by reacting an alkali cyanide and ammonium carbonate with a phenoxymethyl alkyl ketone or phenoxy methyl aryl ketone or phenoxymethyl aralkyl ketone or like phenoxymethyl ketone of the formula,

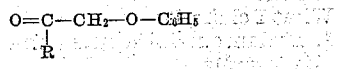

where R has the same significance as given in the above hydantoin formula.

The following examples will serve to illustrate the invention.

EXAMPLE 1

150 grams (1 mole) of phenoxymethyl methyl ketone are added to a mixture of 84.5 grams of potassium cyanide (1.3 moles), about 3 moles of freshly powdered ammonium carbonate and 2 liters of 50% alcohol. The mixture is immersed for 9 or 10 hours in a water bath, kept at a temperature of about 55-60° C. The flask containing the mixture is equipped with an air condenser. After heating at 60° C., the reaction mixture is heated 3 more hours at about 90° C. The contents of the flask are acidified and cooled and the precipitate filtered off, dissolved in alcohol and treated with decolorizing charcoal (Norite). The charcoaled alcoholic solution is filtered from the Norite, diluted with water and the 5-phenoxymethyl-5-methyl hydantoin which precipitates out is filtered off. It has a melting point of 147° C. (corrected), is very soluble in 95% alcohol and acetone and moderately soluble in 50% alcohol and water.

Analysis: calculated for $C_{11}H_{12}O_3N_2$: C, 59.97; H, 5.50; N, 12.73.

Found: C, 59.65; H, 5.63; N, 12.81.

The hydantoinate salts of the product of this example corresponding to the compounds of the general formula in which X represents an alkali or alkaline earth metal or magnesium are obtained by reacting a basic or alkaline solution of an alkali metal or alkaline earth metal or magnesium compound with the hydantoin.

EXAMPLE 2

The intermediate phenoxymethyl n-propyl ketone used in this example is a new compound and can be prepared as follows:

49.2 grams of n-propyl bromide (0.4 mole) are diluted with 100 cc. of anhydrous ether and the mixture added to 1.05 parts of magnesium turnings to form the propyl magnesium bromide Grignard reagent. One part of phenoxy aceto nitrile is then added with 100 cc. of dry ether. The reaction product is warmed gently for 1 hour, cooled in an ice bath and decomposed with ice cold 10% hydrochloric acid. The phenoxymethyl n-propyl ketone is separated, dried over anhydrous calcium chloride, the dry ethereal solution separated from the calcium chloride, the ether evaporated off and the phenoxymethyl n-propyl ketone obtained as a fraction boiled at 112° C. (corrected) at 4 mm. pressure. It analyzes almost the theoretical percentages of carbon and hydrogen for the formula $C_{11}H_{14}O_2$.

178 grams (1 mole) of phenoxymethyl n-propyl ketone, prepared for example as described above, are mixed with 1.3 moles of potassium cyanide, 3 moles of ammonium carbonate and 1500 or 1600 cc. of 50% alcohol in a flask equipped with an air condenser. The mixture is immersed for 10 hours in a water bath maintained at 60° C. At the end of this time, the mixture is heated to 90° C. and kept at this temperature for 2 or 3 hours. The contents of the flask are acidified, cooled, the precipitate filtered off, taken up in alcohol, treated with decolorizing charcoal and the clarified alcoholic solution treated with water to cause separation of 5-phenoxymethyl-5-n-propyl hydantoin melting at 149° C. (corrected).

The product of this example can be converted into its hydantoinate salts the same way as described above for the product of Example 1.

The examples serve to illustrate the invention but it is not limited to the details and specific compounds mentioned therein. For instance, I have similarly prepared numerous other 5-alkyl- and 5-aryl-5-phenoxymethyl hydantoins as well as the intermediate phenoxymethyl ketones necessary for their synthesis. Some of the intermediates and final products are as follows:

TABLE I

Phenoxymethyl ketones, $C_6H_5$—O—$CH_2$—CO—R

| —R | —$CH_3$ | —$CH_2CH_3$ | —n—$C_3H_7$ | —n—$C_4H_9$ |
|---|---|---|---|---|
| B.P.,°C.(corr.) | 110–112 | 98–100 | 112 | 130 |
| Mm. of mercury | 12 | 5 | 4 | 4 |
| $d^{20}_4$ | 1.0903 | 1.0740 | 1.0490 | 1.0192 |
| $n^{20}_D$ | 1.5228 | 1.5201 | 1.5148 | 1.5068 |
| Mol. ref.: Calcd / Found | 41.82 / 42.06 | 46.43 / 46.47 | 51.05 / 51.18 | 55.67 / 55.76 |
| Carbon, per cent: Calcd / Found | 71.96 / 71.80 | 73.13 / 73.42 | 74.11 / 74.07 | 74.95 / 75.48 |
| Hydrogen, per cent: Calcd / Found | 6.72 / 7.02 | 7.37 / 7.24 | 7.92 / 8.06 | 8.39 / 8.61 |
| Semicarbazone, M. P. °C. | 176 | 101.5 | 108.5 | 76 |

| —R | —s—$C_4H_9$ | —n—$C_5H_{11}$ | —iso—$C_5H_{11}$ | —$C_6H_5$ |
|---|---|---|---|---|
| B.P. °C. (corr.) | 117 | 153 | 140 | 187 |
| Mm. of mercury | 4 | 1 | 10 | 8 |
| $d^{20}_4$ | 1.0283 | 1.0025 | 1.0067 | Phenoxymethyl. |
| $n^{20}_D$ | 1.5065 | 1.4960 | 1.5035 | Phenyl ketone, M.P.,74° (corr.). |
| Mol. ref.: Calcd / Found | 55.67 / 55.56 | 60.29 / 60.07 | 60.29 / 60.58 | |
| Carbon, percent: Calcd / Found | 74.95 / 75.05 | 75.68 / 75.52 | 75.68 / 75.55 | 79.21 / 79.06 |
| Hydrogen, per cent: Calcd / Found | 8.39 / 8.57 | 8.78 / 9.01 | 8.78 / 8.66 | 5.71 / 5.74 |
| Semicarbazone, M.P.,°C. | Liquid | 87.5–88.0 | 83.5–84.0 | 187.0–187.5 |

TABLE II
5-phenoxymethyl-5-alkyl or phenylhydantoins
$(C_3H_2O_2N_2)$—$CH_2$—$CH_2$—O—$C_6H_5$
                     |
                     R

| —R | —$CH_3$ | —$C_2H_5$ | —n—$C_3H_7$ | —n—$C_4H_9$ |
|---|---|---|---|---|
| M. P., °C. (corr.) | 147 | 176 | 149 | 162 |
| Carbon, per cent: Calcd / Found | 59.97 / 59.65 | 61.50 / 61.60 | 62.87 / 62.57 | 64.10 / 63.74 |
| Hydrogen, per cent: Calcd / Found | 5.50 / 5.63 | 6.02 / 6.05 | 6.50 / 6.63 | 6.92 / 6.89 |
| Nitrogen, per cent: Calcd / Found | 12.73 / 12.81 | 11.97 / 12.28 | 11.28 / 11.30 | 10.68 / 10.30 |

| —R | —s—$C_4H_9$ | —n—$C_5H_{11}$ | —i—$C_5H_{11}$ | —$C_6H_5$ |
|---|---|---|---|---|
| M. P., °C. (corr.) | 195 | 166 | 181.5 | 181 |
| Carbon, per cent: Calcd / Found | 64.10 / 63.75 | 65.18 / 65.18 | 65.18 / 64.92 | 68.08 / 68.00 |
| Hydrogen, per cent: Calcd / Found | 6.92 / 7.22 | 7.30 / 7.38 | 7.30 / 7.54 | 5.00 / 5.13 |
| Nitrogen, per cent: Calcd / Found | 10.68 / 10.50 | 10.19 / 10.00 | 10.19 / 10.40 | 9.93 / 10.01 |

Other compounds coming within the general formula can be made from the corresponding phenoxymethyl ketones in which R of the general phenoxymethyl ketone formula is a hydrocarbon radical such as benzyl, cyclohexyl, tolyl, cinnamyl, etc.

The compounds are useful as intermediates for the preparation of pharmaceutically useful compounds. Many of them are directly useful for therapeutic purposes, especially as anticonvulsants.

The preferred hydantoin compounds are those in which R of the general hydantoin formula is a lower alkyl radical, that is, an alkyl radical containing less than about 6 carbon atoms.

As described above under Example 1, the hydantoinate salts of alkali metals and alkaline earth metals and magnesium are obtained by reacting a basic or alkaline solution of an alkali metal or alkaline earth metal or magnesium compound with any of the above mentioned hydantoins.

What I claim is:
1. Hydantoin-substituted phenyl methyl ethers of the formula,

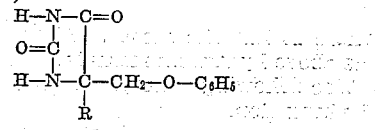

and their corresponding alkali metal, alkaline earth metal, and magnesium hydantoinate salts, R being a lower alkyl radical, prepared for use as a therapeutic agent.

2. The sodium salt of a hydantoin-substituted phenyl methyl ether of the formula,

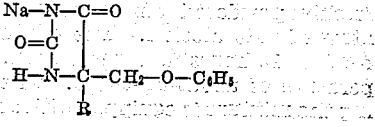

where R is a lower alkyl radical, prepared for use as a therapeutic agent.

3. 5-phenoxymethyl-5-ethyl hydantoin, and its corresponding alkali metal, alkaline earth metal, and magnesium hydantoinate salts, prepared for use as a therapeutic agent.

4. 5-phenoxymethyl-5-ethyl hydantoin, prepared for use as therapeutic agent.

5. The sodium salt of 5-phenoxymethyl-5-ethyl hydantoin, prepared for use as a therapeutic agent.

HENRY R. HENZE.

Certificate of Correction

Patent No. 2,327,890. August 24, 1943.

HENRY R. HENZE

It is hereby certified that error appears in the printed specification of the above numbered patent requiring correction as follows: Page 2, second column, lines 3 and 4, Table II, for and that the said Letters Patent should be read with this correction therein that the same may conform to the record of the case in the Patent Office.

Signed and sealed this 4th day of July, A. D. 1944.

[SEAL]

LESLIE FRAZER,
*Acting Commissioner of Patents.*